Feb. 25, 1941.    J. G. DOUGLAS    2,233,248
STEERING GEAR FOR VEHICLES
Filed Feb. 10, 1939    3 Sheets-Sheet 2
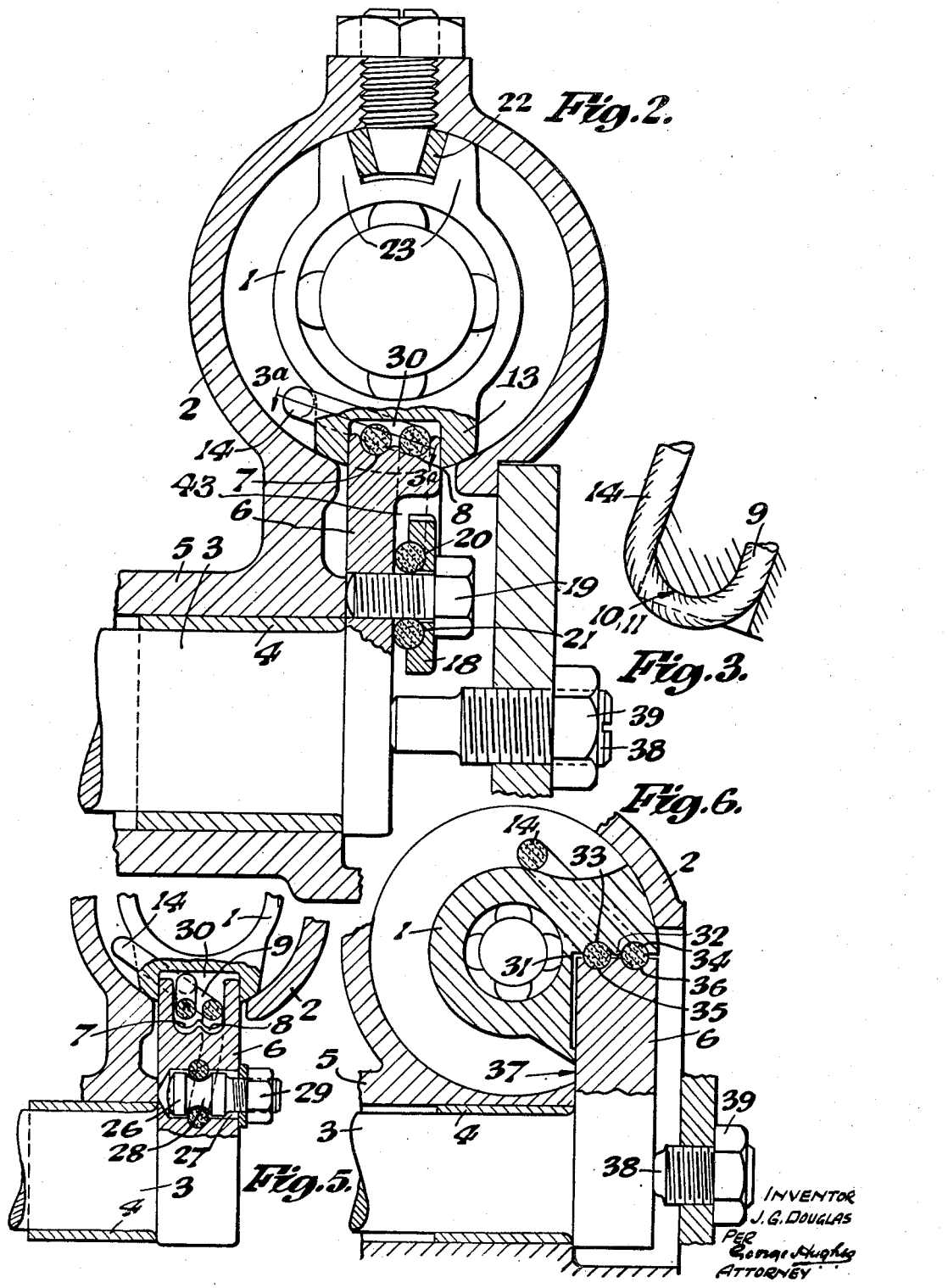

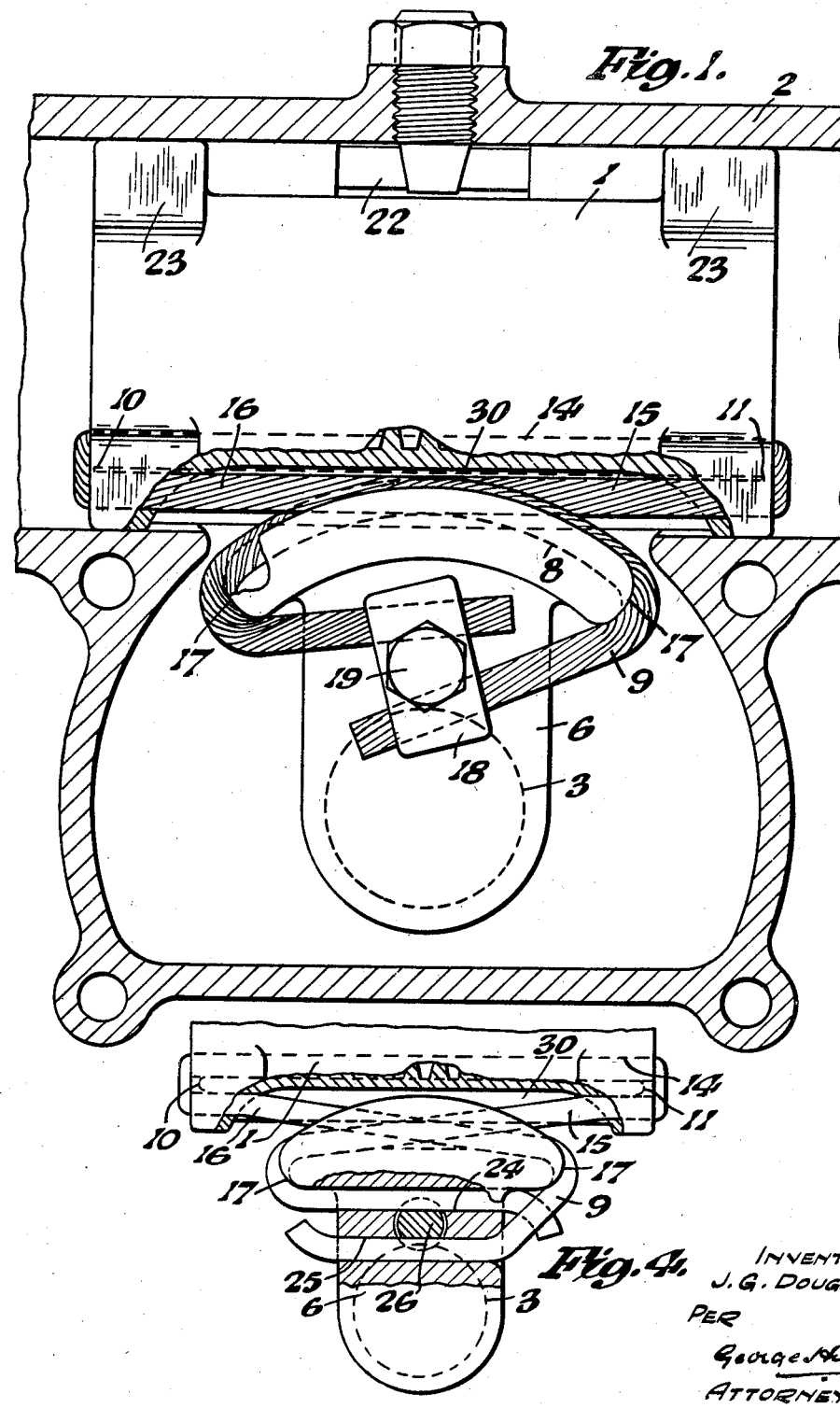

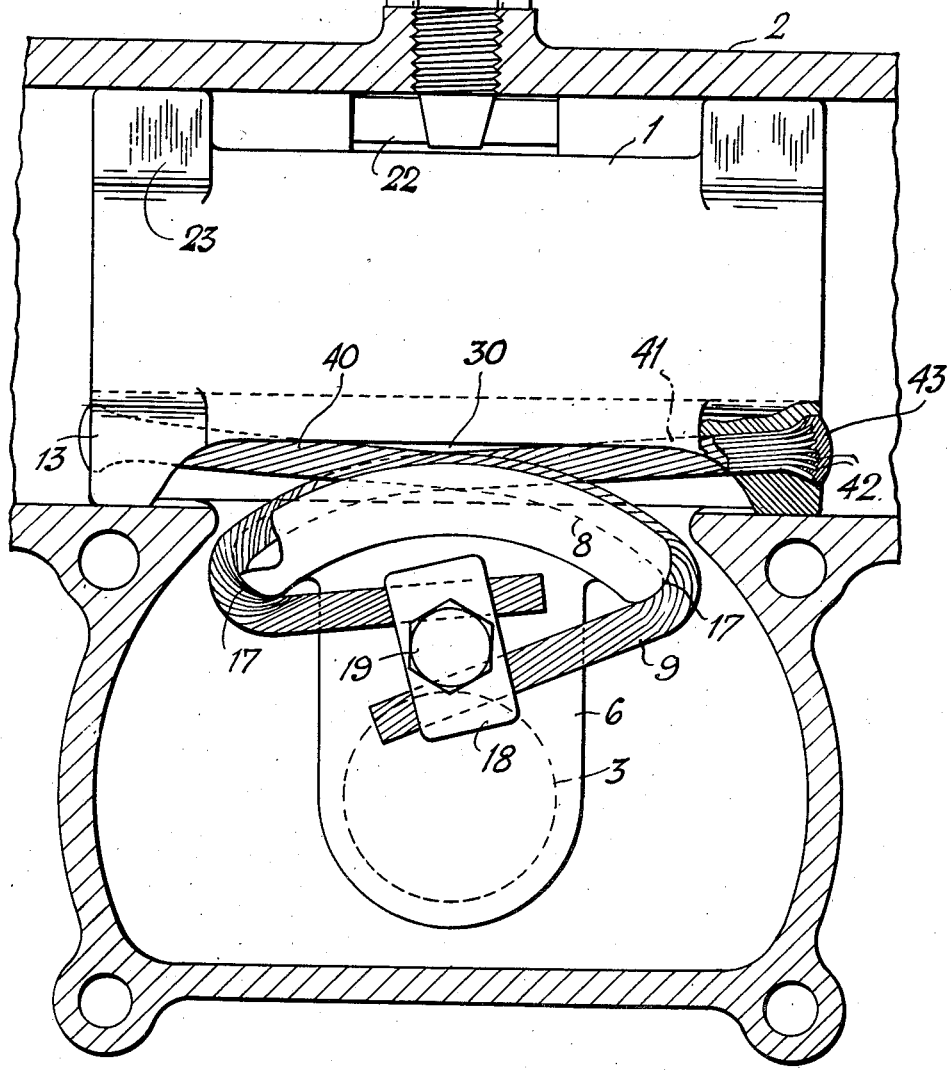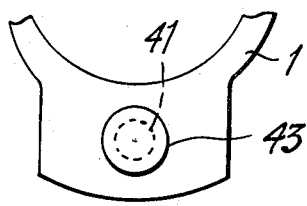

Patented Feb. 25, 1941

2,233,248

UNITED STATES PATENT OFFICE 2,233,248

STEERING GEAR FOR VEHICLES

John George Douglas, Dirgarve, Aberfeldy, Scotland

Application February 10, 1939, Serial No. 255,615
In Great Britain March 24, 1938

9 Claims. (Cl. 74—499)

This invention relates to motor vehicle or the like steering mechanism. The invention is more particularly concerned with steering gear in which a steering shaft is rotated to impart translative movement to a suitable operating member, e. g. the type of gear in which a screw thread or worm on the lower end of the steering shaft or column engages in a slidable nut, the latter being connected to a rocker arm or lever and spindle fast thereto for actuating the usual linkages for operating the road wheels.

The chief object of this invention is to eliminate back lash and to obtain high efficiency cheaply. Other objects of my invention are to provide an improved connection between nut and arm; to obtain at will and by slight modifications only of the parts either constant angular movements of the rocker arm and its spindle, or any desired degree of increase in effective length of radius of the rocker arm, or decrease thereof, for given longitudinal movements of the nut from the straight ahead to either full lock positions; to obtain maximum efficiency of the mechanism under all the above conditions, with elimination of any initial or subsequent lost motion through the usual effects of tolerance between the parts or subsequent wear; to eliminate any line contacts under stress or load; to eliminate any relatively moving parts in the said connection, thus totally eliminating friction or wear consequent thereon and to provide a connection and gear of simple, convenient and inexpensive construction having the above mentioned advantages.

Broadly my present invention is characterised by the use of flexible means transmitting movement of a translatively movable member actuated by a steering shaft to an angularly movable steering gear element such as, e. g. a rocker arm.

My invention is preferably adapted to worm and nut steering gear, and in such an arrangement the connection between the nut and the rocker arm consists of a high-tensile but flexible cable, stranded steel wire rope, chain or the like, fast between its ends to the nut and at its ends to the rocker arm.

In order that my invention may be clearly understood and readily carried into effect modifications are illustrated by the accompanying drawings, and wherein, Fig. 1 is a part sectional side elevation showing the cable connection between nut and rocker arm in a worm and nut steering gear.

Fig. 2 is a sectional end elevation of Fig. 1.

Fig. 3 is a section on the line 3a—3a of Fig. 2.

Fig. 4 is a broken detail part sectional side elevation showing a method of obtaining increased rocker arm radius at locks, i. e. at extreme steering positions.

Fig. 5 is a sectional end elevation of Fig. 4,

Fig. 6 is a detail sectional end elevation view of a further modification showing a method of obtaining a very compact gear and the elimination of a splined or keyed guide to prevent rotation of the nut about its axis.

Figure 7 is a part sectional side elevation showing the use of two separate lengths of cable for connection between nut and rocker arm in a worm and nut steering gear similar to that shown in Figure 1 and Figure 8 is an end elevation of the lower portion of the nut showing the attachment of the cable to the nut.

Referring to the drawings, in the arrangements shown in Figs. 1 and 2 I employ a cylindrical nut 1 slidably but non-rotatably supported in a housing barrel 2, the rocker arm spindle 3 being supported in suitable bearings 4 in an extension 5 of this housing at right angles to said barrel, and the rocker arm 6 being substantially of the sector form and in the position of a similar sector in the known worm and sector type of steering gears, but in place of the usual wormwheel teeth on the rocker arm or sector, I leave the rim or outer end of the rocker arm plain or preferably having two side by side part circular section grooves 7 and 8 suitable to receive the appropriate parts of a length of cable 9. The cable 9 is threaded through slots having radiused bottoms and cross-sectional form equal to the cable diameter, it being seen that these slots are located in the flange like ends 13 of the cylindrical nut, these ends affording the sliding cylindrical surfaces engaging the housing 2. The slots 10 and 11 are arranged so that the central part 14 of the length of the cable (see Fig. 1) passes along the nut parallel with the nut axis and so that the two ends of the cables are then returned in opposite directions around the slot bottoms to afford two contiguous parts 15 and 16 lying parallel with each other longitudinally of nut axis and within recess or keyway 30 hereinafter referred to, and passing tangentially on to the two grooves 7 and 8 in the periphery of the segmental rocker arm 6. The ends of this grooved arcuate extremity of the rocker arm 6 are radiused as at 17 (see Fig. 1) to enable the cable ends to be engaged with suitable securing means, and so that direct tension does not occur on such securing means.

The said securing means is preferably such as to afford simple means for taking up any slack that might occur in the cable, and for obtaining the initial tension in the two ends of cabling, a convenient device comprising a clamping plate 18 urged towards the outer face of the rocker arm 6 by a stud 19, such clamping plate being grooved above and below the stud 19 as at 20 and 21 to partly accommodate the cable. The grooved parts 20 and 21 and the opposed parts of the rocker arm may be serrated to enhance the gripping action, and if necessary a grub screw or other suitable locking means can be engaged with a suitable part of the stud 19.

The slots 10, 11 in the end annular faces of the nut are open to receive the cabling and their bottoms are of suitable radiused form to enable the cabling to form the required approximately 180° curve in such faces when the straight part 14 is bent round these faces so as to enter the ends of recess 30, and their cross section is equal to that of the cabling.

It will be appreciated from the foregoing that the alternating pull on the operative or loose ends of the cable (loose that is until they are connected to the far ends of the rocker arm rim as described hereinabove) does not impose stresses on the fast connections to the ends of the nut, but is self-contained within the cable itself, the two 180° curves of comparatively small radii 10 and 11, one at each end of the nut, around which the cable passes, being in themselves sufficient to prevent the pull on one end of the cable from causing relative and undesired movement between the cable and the nut; but it will be understood that additional preventive or preventives may be used, such for example as soldering the cable at the aforesaid ducts or along the straight part 14 or providing any suitable type of clamp or clip at any suitable portion of the engagement of inoperative part of the cable with the nut.

To obviate rotation of the nut a slip key 22 can be located in the barrel 2 and disposed between the opposed faces of longitudinal key-way ribs 23 formed on the nut (see Fig. 2). However, it is preferable to obviate the necessity of a key and groove device by adopting, as hereinafter described the engagement of the rocker arm 6 with the nut as a means to effect the action of a spline.

In the arrangement shown in Figs. 1 and 2 the rim arc of the rocker arm 6 is concentric with its spindle 3 so that the effect of constant angular velocity similar to the known worm and sector, or worm and wheel, gear is obtained; but it will be understood that the rim of the rocker arm may be so shaped relatively to the spindle axis, that as the nut travels towards one or other lock positions and the rocker arm consequently changes its angular position under the influence of the pull of the cables, this pull exerted at the rim if the latter, for example, increases its radius from the spindle axis, as the arm moves from the centre ahead position towards a lock position, will act at a greater distance from the said spindle axis as the full lock position is reached, thus obtaining the desired degree of increased leverage or mechanical advantage in that position as compared with the centre ahead. Such a latter arrangement is shown in Figs. 4 and 5 in which the grooves 7 and 8 in the rocker arm rim are struck at a considerably larger radius than the rocker arm radius appropriate to the axis of the spindle 3, e. g. the grooves 7 and 8, as shown on Fig. 4, can be almost or if desired exactly parallel with the axis of the nut when the rocker arm is in its central or straight ahead steering position.

The means for anchoring the ends of the cable described with reference to Figs. 1 and 2 involves, by preference of construction for such purpose, the formation of a step 43 or reduction in thickness of the rocker arm to afford accommodation for the clamping plate 18 and also to keep the cable ends as close as reasonably possible to the planes of the grooves 7 and 8. However, advantage is taken of Figs. 4 and 5 to show a modification of the means for anchoring the ends of the cable in which the anchorage is effected within the rocker arm.

This latter form of anchorage can be effected by threading the ends of the cable through a parallel pair of holes 24 and 25 in the rocker arm and opposite sides of a retaining pin 26 fitted in a recess 27 in the rocker arm such recess being intersected at diametrically opposite points by the holes 24 and 25 so that a groove 28 around the pin 26 will receive sections of the cable ends and will effect a binding action thereon by tightening a nut 29 on the pin 26.

Instead of, or in addition to, relying upon the key 22 to prevent rotation of the nut 1, the nut can be held against rotation by engagement of the flanks of the rocker arm 6 at its outer end in the longitudinal channel 30 formed in the opposed part of the nut 1, this channel also receiving the appropriate parts of the cable, as already described.

An important feature of this part of my invention is that as the key, represented by the rim sides of the rocker arm, and the key way, represented by the sunk recess in the nut, are at all times moving substantially with each other and in the same direction, practically no relative or frictional movement takes place between them. It will be understood that if desired the rim sides may instead of being clear from the edges of the requisite opening or slot in the housing, fit these edges closely but freely as well as the sides of said keyway in the nut, in this case the restraint against rotation of the nut is given by said edges instead of by the spindle axial restraints above mentioned; it will also be understood that the depth of the keyway in the nut is such as to permit the proper passage of the connecting cables between the rim grooves of the rocker arm and the bottom of such keyway; also that where those grooves are not concentric with the spindle axis as for non-constant angular operation, nevertheless the tops or outer rim of these grooves, forming the periphery of the rocker arm itself, is made concentric so as to perform the function of the restraining key and maintain always the same depth of engagement in the keyway in the nut. Another method of utilising the rocker arm for preventing rotation of the nut is illustrated in Fig. 6, in which a right angled section is removed longitudinally from the nut for a depth sufficient to accommodate the thickness of the rocker arm within the radius of the nut, thereby minimising space. Such an arrangement produces a step 31 in the nut, and a face 32 of this step, approximately radial in relation to the nut axis is formed with nearly semi-circular section channels 33 and 34 opposed to like channels 35 and 36 in the arcuate outer edge of the rocker arm to receive as a close fit the appropriate parts 15 and 16 of the cable. This affords a step against one direction of movement (clockwise in Fig. 6) of the nut, whilst the other stop for preventing rotation of the nut in the counter direction is afforded by the inner flank of the rocker arm abutting against a machined face 37 of the step, or cut-away portion, in the nut. In common with the arrangements shown in the other figures endwise movement of the rocker arm spindle 3 is prevented by a set screw 38 locked by a nut 39. This arrangement is of course more particularly suited to the use of a rocker arm with an arcuate rim concentric with its axis of rotation, but the step 32 and outer edges of the rocker arm may contact and act as restraints.

Instead of using a single length of cable, two separate cables can be employed as shown in Figures 7 and 8. One end, 42, of a length of cable 41 is attached fast to one end of the nut 1 the strands being opened out into a recess in the nut 1 and the spaces between the strands 42 being opened and filled with solder or similar material. The other end of the cable 41 is made fast to the far end of the rocker arm rim in exactly the same manner as described with respect to the embodiment shown in Figure 1. The other end of the nut 1 and rocker arm 6 is connected by a cable 40 in precisely the same manner; therefore, each of the cables 40—41 is in pure tension on the appropriate lock and no initial lost motion exists, and as there are no parts having relative motion of frictional nature insofar as the connection between nut 1 and rocker arm 6 are concerned there will be no subsequent wear. The cables 40—41 employed are perfectly non-extensible, but should any stretch occur this is easily taken up by operating one or both of the end connections of the cables 40 and 41 to the rocker arm 8 so as to draw the cables tight again.

It will be understood that in referring to the rocker arm 6, the invention is not limited to any particular design of rocker arm, e. g. it need not be a limb radiating from the spindle 3, but may be a disc concentric or eccentric with said spindle and with the cable ends wound one or a part or more times in grooves in the periphery of the disc. However, for simplicity, general efficiency and compactness, the form of rocker arm shown is preferred. Also, although a solid or one-piece rocker arm is shown, this may be constructed with suitable spools having appropriate grooves for receiving the cabling, at each end in place of curves 17; and these spools may be secured eccentrically so that by partial rotation and reclamping of their securing bolt, any desired tension may be imparted to the cabling, or tension restored if lost after long use.

It will be apparent that by means of my invention there is provided a steering gear which comprises a translatively movable member, a rotatable steering member to actuate the translatively movable member, an angularly displaceable member, flexible means connecting the translatively and angularly movable members in equal and opposed self-contained tension so that the parts are in equilibrium and no frictional restraint imposed on their movements by reason of such connection, such tension being adjustable and greater than the maximum loading imposed on the steering mechanism during steering operations, so that possibility of lost motion initially or after prolonged use is avoided.

I claim:

1. Worm and nut steering gear comprising a nut, a worm to traverse the nut, a rocker arm and a length of cable secured between its ends to the nut and guided under tension in opposite directions from longitudinally spaced or opposite ends of the nut along an outer part of the rocker arm located in juxtaposition to the nut, the cable ends being secured to the rocker arm to hold the cable under tension.

2. Worm and nut steering gear comprising a nut, a worm to traverse said nut, a rocker arm, and flexible but inextensible means connecting said nut and said rocker arm, said means being secured to said nut to apply opposing tension to said rocker arm from two longitudinally spaced points on said nut.

3. Worm and nut steering gear comprising a nut, a worm to traverse said nut, a rocker arm, a pair of side by side grooves in an outer edge of said rocker arm remote from the axis of rotation of said rocker arm, and a pair of cables connecting said nut and said rocker arm, each of said cables being secured at one end to the rocker arm and at the other end to one end of said nut and each having an intermediate portion bearing in one of said grooves.

4. Worm and nut steering gear comprising a nut, a worm to traverse said nut, a rocker arm, a length of cable connecting each end of said nut to said rocker arm, portions of which intermediate said nut and said arm lie along and bear against an outer edge of said rocker arm remote from its axis of rotation.

5. Worm and nut steering gear comprising a nut, a pair of longitudinally disposed end flanges on said nut, a worm to traverse said nut, a rocker arm, a pair of side by side grooves in an outer edge of said rocker arm and remote from its axis of rotation and a single cable connecting said nut and said arm, said cable being wrapped with overlapping ends around at least one of said flanges, said overlapping ends being passed along said grooves to bear therein, the extremities of said cable being secured to said rocker arm.

6. Worm and nut steering gear comprising a nut, a worm to traverse said nut, a rocker arm having an outer edge remote from its axis of rotation, the distance of said edge from said axis increasing from the median line to the outer parts of said edge, cabling connecting said nut and said rocker arm, said cabling being secured to either end of said nut and lying along and bearing against the outer edge on said rocker arm.

7. Worm and nut steering gear according to claim 6 wherein the outer edge of said rocker arm along which and against which the cabling bears is arcuate.

8. A worm and nut steering gear according to claim 4 comprising a clamping plate and a threaded member passing through said plate into the rocker arm, said plate being adapted to grip the ends of the cable against the side of the rocker arm.

9. A worm and nut steering gear according to claim 3 comprising clamping means for the ends of the cable on the rocker arm including a grooved pin fitting into an aperture in the rocker arm, and a pair of guide ways in said arm intersecting opposite sides of said aperture and adapted to receive the cable ends, and means for applying axial pressure to said pin to grip said cable.

JOHN GEORGE DOUGLAS.